United States Patent [19]

Pinto et al.

[11] Patent Number: 4,772,420

[45] Date of Patent: Sep. 20, 1988

[54] GAS SEPARATION

[75] Inventors: Alwyn Pinto, Middlesbrough; John B. H. Johnson, Stockton-on-Tees, both of England

[73] Assignee: Imperial Chemical Industries PLC, London, England

[21] Appl. No.: 72,522

[22] Filed: Jul. 13, 1987

Related U.S. Application Data

[63] Continuation of Ser. No. 786,008, Oct. 10, 1985, abandoned.

[30] Foreign Application Priority Data

| Oct. 18, 1984 | [GB] | United Kingdom | 8426393 |
| Oct. 22, 1984 | [GB] | United Kingdom | 8426665 |
| Nov. 20, 1984 | [GB] | United Kingdom | 8429317 |
| Dec. 21, 1984 | [GB] | United Kingdom | 8432487 |

[51] Int. Cl.$^4$ .............................. C01B 3/56; C01B 3/58
[52] U.S. Cl. .................................. 252/377; 252/374; 252/376
[58] Field of Search ..................... 252/374, 376, 377

[56] References Cited

U.S. PATENT DOCUMENTS

| 3,176,444 | 4/1985 | Kiyonaga. |
| 3,430,418 | 3/1969 | Wagner. |
| 3,564,816 | 2/1971 | Batta. |
| 3,986,849 | 10/1976 | Fuderer et al. |
| 4,077,779 | 3/1978 | Sircar et al. |
| 4,479,925 | 10/1984 | Shires et al. |
| 4,592,860 | 6/1986 | Fuderer. |

FOREIGN PATENT DOCUMENTS 2126573 3/1984 United Kingdom.

Primary Examiner—Howard T. Mars
Attorney, Agent, or Firm—Cushman, Darby & Cushman

[57] ABSTRACT

A raw ammonia synthesis gas, preferably containing an excess of nitrogen, is converted to synthesis ready ammonia synthesis gas by two pressure swing adsorption (PSA) stages operated in succession. If the raw gas contains carbon monoxide this is chemically removed, e.g. by methanation, between the PSA stages. In the first PSA stage, $CO_2$ is removed and waste gas from the second PSA stage is preferably fed back to the first PSA stage for sweeping, purging or repressurizing. In a preferred system the first PSA cycle includes a sweep with $CO_2$-rich gas prior to depressurization and purge with second PSA waste gas. In the second PSA stage inert medium boiling gases, and any unwanted nitrogen are removed as the waste gas.

11 Claims, 10 Drawing Sheets

GAS SEPARATION

This is a continuation of application Ser. No. 786,008 filed Oct. 10, 1985, abandoned.

This invention relates to gas separation and in particular to producing synthesis-ready ammonia synthesis gas from a raw synthesis gas.

Such a raw synthesis gas is generally prepared, using a hydrocarbon feedstock, for example natural gas or naphtha, by the sequence of primary and secondary steam reforming or partial oxidation (with air, or oxygen-enriched air being employed in the secondary reforming or partial oxidation step) to give a gas stream containing hydrogen; nitrogen and argon (from the air); carbon oxides; steam (as an excess of that required for reforming or as produced in the partial oxidation); and, generally, a small amount of methane. This gas mixture is then subjected to the shift reaction wherein carbon monoxide reacts with steam to produce hydrogen, thereby increasing the hydrogen content of the gas, and carbon dioxide. The shifted gas is then cooled, eg to a temperature below 50° C. to condense the steam present as liquid water which is then separated. The resultant gas is the raw synthesis gas.

For use in ammonia synthesis the synthesis-ready gas should contain hydrogen and nitrogen, should be essentially free of gases such as steam, carbon dioxide, and carbon monoxide, which deactivate the ammonia synthesis catalyst, and desirably is essentially free of inerts such as methane and argon in order to minimise any purge from the ammonia synthesis loop.

The ammonia synthesis reaction involves the reaction of 1 mole of nitrogen with 3 moles of hydrogen and so, in order to minimise any purge from the synthesis loop, the synthesis-ready ammonia synthesis gas desirably has a $H_2/N_2$ molar ratio near to 3, for example in the range 2.5 to 3.1. However it is often advantageous to conduct the aforementioned secondary reforming or partial oxidation steps with such an amount of air, or oxygen-enriched air that in the raw synthesis gas there is an excess of nitrogen over that required in the synthesis-ready ammonia synthesis gas.

The raw synthesis gas thus usually contains hydrogen, carbon monoxide, carbon dioxide, methane, argon, and nitrogen, the latter often being in an excess of that required for ammonia synthesis.

Carbon monoxide, nitrogen, and the inerts such as methane and argon, have boiling points, at atmospheric pressure, in the range −100° to −200° C.: such gases are hereinafter termed medium boiling gases and are hereinafter referred to as MB.

It is therefore necessary, in order to convert the raw synthesis gas into synthesis-ready ammonia synthesis gas, to separate from that raw synthesis gas carbon oxides and, in order to minimise the purge, if any, from the ammonia synthesis loop, it is desirable to separate from the raw synthesis gas any excess of nitrogen and other MB gases.

It has been proposed in GB-A-2126573 to carry out such a separation by a pressure swing adsorption (PSA) process but the percentage recovery of hydrogen is low (72.4%) and the PSA product gas has to be methanated and dried before it can be contacted with an iron ammonia synthesis catalyst. Other proposals, such as in GB-A-2103199 or European Chemical News 1978, 20 October, 39–37, have involved feeding a $N_2$-free raw gas to the PSA system and adding $N_2$ in the course of the PSA cycle or thereafter; such proposals are unsatisfactory in requiring an external supply of substantially pure nitrogen. It appears that recovery of the $CO_2$ from such proposed processes is inefficient owing to the low pressure and/or purity of the $CO_2$-containing waste stream from the PSA system, and consequently they do not provide an attractive route to an integrated ammonia/urea process or to manufacture of solid or liquid $CO_2$.

In the present invention these disadvantages are overcome by the use of two PSA stages.

According to the invention there is provided a process for the production of synthesis-ready ammonia synthesis gas from a raw gas containing hydrogen, carbon dioxide and medium boiling gas including nitrogen comprising removing carbon dioxide and unwanted medium boiling gas by pressure swing adsorption characterised by (a) subjecting the raw gas to a first PSA system effective to remove carbon dioxide while leaving hydrogen and medium boiling gas largely unadsorbed; and (b) subjecting the unadsorbed gas to a second PSA system effective to separate therefrom a waste gas stream containing said unwanted medium boiling gas, including the excess, if any, of nitrogen; and wherein, if the unadsorbed gas leaving the first PSA system contains carbon monoxide, subjecting that unadsorbed gas to chemical removal of carbon monoxide, preferably by catalytic methanation, prior to subjecting said unadsorbed gas to said second PSA system.

Each PSA system can be broadly of the type wherein there is a plurality of adsorbent beds and each bed takes part, successively, in steps including adsorption, pressure equalisation, depressurisation to exterior, and repressurisation, with an optional purge step between depressurisation and repressurisation.

In the ensuing description of the preferred PSA systems, the terms "inlet" and "outlet" refer to the direction of flow of gas during the adsorption step, and the terms "co-current" and "counter-current" mean towards such outlet and inlet respectively.

In the first PSA system the pressure of the raw gas entering a bed undergoing adsorption duty is preferably in the range 25 to 50, especially 30 to 40, bar abs. The temperature in the first PSA system is preferably higher than in conventional PSA systems in order to increase the purity and/or pressure of the $CO_2$-rich stream evolved in the final depressurisation to exterior or in the purge step. Suitable temperatures are up to 200° C., especially in the range 60°–150° C. Such a PSA process is among those described in our European application and U.S. application claiming priority from UK application 8426393. However, conventional temperatures of up to about 50° C. can also be used satisfactorily, especially if, as described hereinafter, waste gas from the second PSA system is fed to the first PSA system.

The adsorption step in the first PSA system is preferably terminated sufficiently before the $CO_2$-front has reached the bed outlet in order to ensure that the $CO_2$ content of the unadsorbed gas, integrated over the adsorption step, is at the required level, typically under 0.5 and preferably under 0.2% v/v. The $CO_2$ content of the gas tends to rise towards the end of the adsorption step as its adsorption tail approaches the bed outlet. The $H_2/MB$ molar ratio of the unadsorbed gas has a maximum value at an intermediate part of the adsorption step, because at the beginning MB gas adsorbed in preceding equalisation steps and any purge step, if those steps are counter-current, becomes desorbed; and because at the end the MB adsorption front has reached or passed the bed outlet.

After the adsorption has proceeded to the desired extent in a bed, the pressure in that bed is reduced by one or more pressure equalisation steps in which gas from the outlet of the bed that has finished its adsorption duty is released, co-currently out therefrom and is fed, preferably counter-currently, into a recipient bed that has been depressurised and may have been purged and may have been partly repressurised.

There may be one or more presure equalisation steps. Thus, as in the relevant part of the 4-bed system depicted in FIG. 2 of U.S. Pat. No. 3,430,418, on which the system described hereinafter is based, there may be a single equalisation step. Alternatively, as in the relevant parts of the modified 4-bed system depicted in FIG. 2 of U.S. Pat. No. 3,564,816 or of the 5-bed system depicted in FIG. 3 of U.S. Pat. No. 3,430,418, there may be two equalisation steps. Alternatively, as in the relevant parts of the systems using 6 or more beds, for example the 8-bed and 10-bed systems depicted in U.S. Pat. No. 3,986,849, there may be three equalisation steps. Although the pressure equalisations are illustrated by those references, as described below, the PSA cycles that may be used in the process of the invention differ from the disclosed cycles in other respects.

After the pressure equalisation step or steps, the bed is subjected to depressurisation. The depressurisation can be conducted in a variety of ways. For example, the depressurisation may be effected in one step, to desorb $CO_2$, and to release the relatively small amount of MB and $H_2$ remaining in the bed, to the exterior. Alternatively the depressurisation may be effected in a plurality of steps: thus the depressurisation may be conducted, preferably cocurrently, in one or more steps, (hereinafter termed the penultimate depressurisation) to an intermediate pressure level releasing to the exterior an MB-rich/$CO_2$-lean gas and then in a final step, preferably counter-currently, to release to the exterior an MB-lean/$CO_2$-rich gas. Alternatively, in a multiple step depressurisation, in the penultimate depressurisation, the released gas may be used, as described below, to purge another bed: in this mode of operation the gas released to the exterior as the purge from said another bed is enriched in $CO_2$ by the $CO_2$ purged from said another bed: as described above, in the final depressurisation, the bed is depressurised, preferably counter-currently.

The terminal pressure of co-current penultimate depressurisation with product release is preferably at least 2 bar abs and typically up to 10 bar abs. The gas released in this step is leaner in $CO_2$ the higher the pressure. The terminal pressure of final, countercurrent, depressurisation is conveniently in the range 1 to 3 bar abs. However to ensure more complete $CO_2$ desorption the final depressurisation may be to a terminal sub-atmospheric pressure. The $CO_2$-richstream released in this final depressurisation step is richer in $CO_2$ the lower the terminal pressure of the penultimate depressurisation. However the lower the latter pressure, the less will be the proportion of the $CO_2$ in the raw gas that is recovered in the final depressurisation $CO_2$ product stream.

After final depressurisation the bed is optionally purged. For example, as described above, the bed can be purged, preferably counter-currently, with a through-current of gas fed counter-currently out of a bed undergoing penultimate depressurisation. Alternatively the bed can be purged, preferably counter-currently, with a through-current of MB-rich/$CO_2$-free gas from a depressurisation in the second PSA system. As a further alternative the bed can be purged, preferably counter-currently, with a through-current of gas of low or zero $CO_2$ content from an exterior source. If two or more such purges are used, they are preferably effected in the above order.

After final depressurisation, and after purge, if used, the bed is repressurised by gas released from a bed undergoing pressure equalisation as described above and by a feed of unadsorbed gas from the outlet line of a bed, or beds, on adsorption duty. The latter repressurisation may be operated during, as well as after, the repressurisation resulting from a bed undergoing pressure equalisation, in order to avoid excessive fluctuations in the flow rate of unadsorbed gas leaving the bed, or beds, undergoing adsorption duty. Alternatively or additionally, the final repressurisation may be by gas recycled from the second PSA system: this gas may be waste gas or product gas from the second PSA system.

If the unadsorbed, essentiallly $CO_2$ free, gas from the first PSA system contains CO as an MB gas, this unadsorbed gas is then subjected to chemical removal of CO. This chemical removal is preferably a catalytic methanation process to convert all the CO present to methane. This methanation process may also convert most, or all, of any $CO_2$ present in the unadsorbed gas from the first PSA system. The methanation catalyst can be of the well-tried supported nickel and/or cobalt type, containing for example 5–70% w/w of such metal (calculated as monoxide) on a refractory comprising alumina, spinel, cement or aluminosilicate. If desired, however, a supported ruthenium catalyst can be used. The temperature need not be controlled to prevent methanation of $CO_2$ and thus is conveniently in the range 250°–400° C. at the catalyst outlet. Whereas methanation produces by-product water vapour, most of this water vapour can conveniently be removed by cooling to condense the water vapour as liquid water which is readily separated. Any residual water vapour can be removed by the second PSA system. In some cases the second PSA system can remove all of the water vapour produced by the methanation step. Generally no separate adsorptive water vapour removal step is necessary.

The second PSA system may be of the type described in European application No. 85301022, the disclosure of which is incorporated herein by reference and which will publish as EP-A-157480 and which corresponds to U.S. Ser. No. 703,531, operated under conditions to adjust the $H_2$/MB molar ratio to that that required in the synthesis-ready ammonia synthesis gas.

As in the first PSA system, each bed successively undergoes adsorption, pressure equalisation, depressurisation (preferably in two stages, co-current followed by counter-current), and repressurisation with an optional purge step, preferably using co-current depressurisation gas from an other bed, between the depressurisation and repressurisation steps.

In order to limit the magnitude of fluctuations in the composition and flow rate of unadsorbed gas in the adsorption step of each PSA system, each system preferably includes enough beds to permit at least two beds to be used on adsorption duty simultaneously, but out of step with one another. Likewise there are preferably sufficient beds to permit beds to be on simultaneous, but out of step, duties in those other steps, ie depressurisation and purge (if any), where gas is released from the PSA system.

The waste-gas from the second PSA will be essentially $CO_2$ free, particularly where there is a methanation step in which any $CO_2$, as well as CO, is methanated, between the first and second PSA systems. This waste-gas will also be MB-rich/$H_2$-lean. As mentioned above, this waste gas from the second PSA system can be used in the first PSA system. It is therefore possible that the second PSA waste gas can be taken at a higher pressure than is disclosed in the aforesaid European application No. 85301022. A waste gas pressure of at least 2 bar abs. and up to one quarter of the second PSA system gas inlet pressure is preferred. This waste gas may required compression and/or heating to the first PSA system operating conditions but, even so, such use of the second PSA system waste gas may be advantageous.

In one mode of operation waste gas from the second PSA system is fed into a bed of the first PSA system after depressurisation to exterior as part of the repressurisation of that bed. This has the advantage that it returns to the process any $H_2$ in the waste gas of the second PSA system. Part of the waste gas from the second PSA system may be vented in order to prevent accumulation of MB gas in the unadsorbed gas from the first PSA system.

In another mode of operation, a bed of the first PSA system, that has finished its adsorption duty but has not been depressurised to exterior, is swept by a through current, preferably co-currently, of waste gas from the second PSA system, directly, or indirectly, into a recipient bed of the first PSA system after that recipient bed has been depressurised (and purged, if used) and before that recipient bed has finished its adsorption duty. The first PSA system bed may be swept before or after its pressure equalisation step. The effect of this sweep is to displace the unadsorbed gas, which contains $H_2$ and MB and has a $H_2$/MB ratio greater than that of the waste gas from the second PSA system, that is still present in that bed of the first PSA system into the recipient bed: in this way the $H_2$ of the unadsorbed gas in the bed being swept is not lost during subsequent depressurisation to exterior or purge (if used).

The waste gas from the second PSA system can be a gas from co-current depressurisation, counter-current depressurisation or purge or more than one of these. Since by the invention $H_2$ is retained in the process, that gas need not be taken at minimal pressure in order to minimise $H_2$ loss. However, at the preferred inlet and equalisation pressures of the first PSA system, it is usually necessary to compress the waste gas from the second PSA system before feeding it to the first PSA system.

If desired the gas used to sweep the bed of the first PSA system can include one or more other streams of suitable composition, namely $CO_2$-lean or $CO_2$-free, possibly containing MB gases that will be subsequently purged, and advantageously containing $H_2$. Such other streams include intermediate pressure waste gas from the first PSA, or ammonia synthesis purge gas.

There are three preferred ways of effecting a first PSA system sweep with waste gas from the second PSA system: two of these preferred ways involve sweeping after the pressure equalisation step of the first PSA system and are termed "intermediate pressure sweep" while the third way, termed "high pressure sweep", involves sweeping before pressure equalisation.

In the first intermediate pressure sweep mode of operation, the waste gas from the second PSA system is fed into the inlet of a bed of the first PSA system that has just undergone pressure equalisation and is still connected to the recipient bed undergoing repressurisation. By this means gas still in the bed after equalisation is swept into the recipient bed and replaced by second PSA waste gas. The extent to which gas is replaced depends on how much waste gas is available from the second PSA system and on the pressure to which (if at all) it is necessary or convenient to compress it. After this step both the post-equalisation bed and the recipient bed are at a pressure between feed and equalisation; the recipient bed contains unadsorbed product gas and the post-equalisation bed contains second PSA waste gas and may contain some unadsorbed product gas. The postequalisation bed can be equalised with a fully regenerated, i.e. depressurised and optionally purged possibly partly repressurised, bed if one is available, or can be depressurised to waste, possibly stagewise at 2 or more pressure levels.

One further advantage of the use, as described above, of the waste gas from the second PSA system, or unadsorbed product gas swept out thereby, for repressurisation is that less, possibly none, of the gas from the unadsorbed product line of the first PSA system need to be diverted into repressurisation, and hence the flow of unadsorbed product gas from the first PSA system is subject to less fluctuation.

In the second intermediate pressure sweep mode of operation, the waste gas from the second PSA system is fed into a bed that has undergone pressure equalisation, has been disconnected from the recipient bed, and has been connected to the inlet of a compresser, the outlet of which feeds into the raw gas inlet line of the first PSA system. By this means gas still in the bed after equalisation is swept into the PSA raw gas inlet and replaced by second PSA waste gas. The extent to which gas is replaced depends on how much gas is available, but less gas is needed than in the first intermediate pressure sweep mode because it is used only at equalisation pressure, not at pressures up to feed pressure. Since the swept out gas passes into the raw gas inlet, a destination for it is continuously available. After this step, the post-equalisation bed contains second PSA waste gas and may contain unadsorbed product gas if the quantity of second PSA waste gas was insufficient to sweep out all the unadsorbed product gas. If more than this sufficient second PSA waste gas is available, it can be passed into the compressor and raw gas feed inlet, and thereby $H_2$ in the second PSA waste gas will be retained in the process. After the sweep, the post-equalisation bed can be equalised with a fully regenerated, possibly partly repressurised, bed if one is available, or can be depressurised to waste, possibly stagewise at 2 or more pressure levels.

In the high pressure sweep mode of operation, the waste gas from the second PSA system is fed into a bed that has completed its adsorption step, but has not been equalised, and has been connected to the raw gas inlet line of the first PSA system, possibly by way of a booster compressor recovering the pressure-drop through the bed. Thereby unadsorbed product gas still in the bed is swept into the raw gas inlet line and recovered.

Since the bed is at feed pressure, the quantity of waste gas from the second PSA system required is almost double that for the above described second mode of intermediate pressure sweep in which almost half the unadsorbed product gas in the bed is recovered by equalisation. After high pressure sweep the bed can be equalised with a fully regenerated, possibly partly repressurised, bed; such a bed is available if a system of 4 or more beds is used. As an alternative, the swept bed can be depressurised to waste, possibly stagewise at 2 or more pressure levels; in such a system there is an energy penalty in that gas is let down from the highest pressure in the system after having been compressed, but for some users the penalty may be mitigated if there is a use for waste gas at relatively high pressure or if there is reason for having only 2 or 3 beds instead of the 4 or more required when equalisation is practised.

In the aforementioned "sweeping" modes of operation, the waste gas from the second PSA system is preferably passed through the bed being swept co-currently in order to minimise desorption of $CO_2$. This is more critical for the first mode of intermediate pressure sweep since any desorbed $CO_2$ would be adsorbed at the outlet of the recipient bed (assuming flow into its outlet as in equalisation) and thus would contaminate the unadsorbed gas stream fed to the second PSA system in the next adsorption step using that bed. Alternatively in this mode of intermediate pressure sweep, the swept out gas is received co-currently, and this is preferred.

In the second intermediate, and in the high, pressure sweep modes of operation, any desorption of $CO_2$ is less important since this desorbed $CO_2$ will be returned to the raw synthesis gas inlet line.

If sweeping by second PSA waste gas is continued until such waste gas has passed into a bed undergoing repressurisation or into the raw gas feed, there will be an accumulation of MB gases in the combination of the two PSA systems. The same will occur if second PSA waste gas is used directly in repressurisation.

If the adsorbent is correctly chosen and operated, the increased MB partial pressure may result in increased adsorption, so that such accumulation is limited. Otherwise it may be desirable to maintain a purge of MB-rich gas at a suitable point in the system.

Especially in the second intermediate pressure, and in the high pressure, sweep modes, wherein the waste gas from the second PSA system is accumulated in the first PSA system under raised pressure, a subsequent depressurisation to purge another bed can be carried out at two or more pressure levels, so as to produce first a waste gas rich in fuel values but lean in $CO_2$ and finally a waste gas rich in $CO_2$.

It will be appreciated that the waste gas from the second PSA may be used both for sweeping, prior to depressurisation, and also for repressurisation as described above.

In an another alternative, a bed in the first PSA system that has completed is adsorption duty is swept with a $CO_2$ rich gas and the swept-out gas is returned to the raw synthesis gas inlet line. After depressurising the bed to recover $CO_2$, the depressurised bed is purged with waste gas from the second PSA system.

The $CO_2$-rich gas used for this $CO_2$-sweeping is conveniently derived from the $CO_2$-rich gas recovered from the depressurisation of another bed. If desired, the required $CO_2$-rich gas can be supplied by an autonomous circulation system. More conveniently, the requirement of the recipient bed is provided from the storage capacity of pipework and any reservoirs in the $CO_2$ collecting system or, in a suitably designed system, from a bed undergoing desorption of $CO_2$-rich gas in the same time period. The $CO_2$-rich gas may need to be compressed, depending on the pressure of the gas to be swept out. Often the $CO_2$-rich gas will be compressed in the course of use further downstream in a process sequence making for example solid or liquid $CO_2$ or urea; thus the gas used in sweeping can conveniently be taken from such a downstream source.

The bed subjected to $CO_2$-sweeping has preferably been at least once downwardly pressure-equalised with another bed. In such equalisations, carried out with co-current flow from the bed, the $CO_2$ front stays in the bed and thus the gas passed into the recipient bed or beds is $H_2$+MB gas low in $CO_2$ and, since it enters the recipient bed(s) counter-currently, drives back the $CO_2$ front in such bed(s). By sweeping after equalisation the pressure of the $CO_2$-rich gas need not be so high as would be necessary for sweeping before equalisation.

$CO_2$-sweeping is continued preferably co-currently and until the $CO_2$ front has moved towards the bed outlet but remains within the bed. A small $CO_2$ content in the swept-out gas is not harmful if that gas is fed to the raw synthesis gas inlet time of the first PSA system and then a balance may be struck between the advantage of more complete sweeping and the disadvantage of adding more $CO_2$ to the inlet gas.

The effect of the $CO_2$-sweeping step is to expel $H_2$ and MB gases from the void space in the bed and also to desorb $H_2$ and MB gases. Consequently the gas desorbed in the subsequent depressurisation consists almost entirely of $CO_2$ and is very suitable for further processing.

For a $CO_2$-sweeping step the $CO_2$-rich gas needs to be compressed, for example to 6 to 12 bar abs, but such pressures would commonly be needed for the further processing already mentioned. For $CO_2$ recovery the depressurisation, which is preferably counter-current, is for example from 6.12–12 bar abs and can go down, if desired, to less than 1 bar abs., for example to 0.1 bar abs., depending on the extent to which $CO_2$ is required.

After the $CO_2$-sweep and the depressurisation with $CO_2$-recovery, the bed is purged, preferably counter-currently, with waste gas from the second PSA system. The effect of this purge is to desorb still more $CO_2$ since the waste gas from the second PSA system is substantially $CO_2$-free and thus subjects the bed to a still lower $CO_2$ pressure than would be attained in normal depressurisation to below atmospheric pressure. Since the purge gas is not obtained from another bed in the first PSA system, its supply does not depend on a step occurring in another bed of the first PSA system; therefore purging need not be rigidly synchronised with steps occurring in other beds.

The purge outlet gas consists mainly of MB gases, a small percentage of $H_2$ and a content of $CO_2$ depending on the extent to which $CO_2$ was recovered in the depressurisation to $CO_2$ recovery step. If it is desired to keep down the $CO_2$ content of the purge outlet gas but very high $CO_2$ recovery is not required, the void space gas present after the depressurisation can itself be swept out wholly or partly to waste, by means of the second PSA waste gas to be used as purge gas.

The purging pressure, whatever the $CO_2$ content intended in the outlet purge gas, can be superatmospheric, and then the outlet purge gas can be used as a source of power, by heating it and expanding it (preferably with combustion) in a gas turbine; the gas turbine exhaust can supply at least part of the heat required before expansion.

To obtain the required purging pressure the second PSA waste gas can if necessary be compressed. However the waste gas may be taken from the second PSA system at superatmospheric pressure, for example in the range 2-10 bar abs. and the inlet and outlet $H_2/N_2$ ratios of the second PSA system chosen accordingly.

By the use of a $CO_2$-sweep, and purge with waste gas from the second PSA system, a large extent of $CO_2$ desorption is possible. It is therefore possible to use adsorber beds in the first PSA system of unconventionally small volume in proportion to the flow rate of gas to be purified. Alternatively or additionally, adsorption step times can be unconventionally long, for example 4-8 minutes, and thus time is available during each adsortion step for several short steps, of which equalisations, sweeps and depressurisations are examples.

Since the $CO_2$-sweep step returns $H_2$ to the process, the first PSA system does not rely on multiple pressure equalisations to decrease $H_2$ loss and therefore need not include a large number of beds. It appears that the most convenient number will be 4 through 6 or possibly 8 if it is desired to have overlapping operation of successive adsorbers.

Whereas it was indicated above that the first PSA system could advantageously be operated "hot" with inlet temperatures above 40° C. in order to maximise the $CO_2$ content of the stream of recovered $CO_2$, where a $CO_2$-sweep and second PSA waste gas purge are employed, such higher temperature operation can be avoided.

The adsorbent charged to the PSA beds can be any of those considered suitable for PSA, including silica gels, active carbons and zeolites. The adsorbent for at least the beds of the first PSA system preferably includes a zeolite, since zeolites are capable of adsorbing $CO_2$ much more preferentially to the MB gases than the other adsorbents. Such specificity is less at the high temperatures that may be used in the first PSA system than at conventional PSA temperatures, but is fully adequate. When using a high temperature first PSA system, with a zeolite adsorbent, the effect is to produce a $CO_2$ adsorption isotherm that resembles the ambient temperature isotherms for active carbon and silica gel. A suitable zeolite is of the A type, for example calcium A (Zeolite A is defined in D W Breck's "Zeolite Molecular Sieves" and is available from several manufacturers under different trade names). The following table sets out values of the adsorption constants K, where $$K = \frac{kg \cdot mols\ of\ adsorbed\ gas\ per\ kg\ of\ adsorbent}{pressure\ in\ bar\ abs.}$$

for $CO_2$ and $N_2$ and of the ratio $K_{CO2}/K_{N2}$ for a zeolite and an active carbon. The values at 30, 70 and 100° C. are quoted from page 565 of "Gas Purification" by A. L. Kohl and S. C. Riesenfeld, 3rd ed. 1979 (Gulf Publications, Houston, Tex., USA) and those at 150° C. are obtained by Clausius Clapeyron-type calculation.

TABLE

| | K, kg · mol kg$^{-1}$ bar$^{-1}$ at T° C. | | | |
|---|---|---|---|---|
| | T = 30° | T = 70 | T = 100 | T = 150 |
| Zeolite $N_2$ | 26 × 10$^{-5}$ | 11.9 × 10$^{-5}$ | 7.4 × 10$^{-5}$ | 3.9 × 10$^{-5}$ |
| $CO_2$ | 0.161 | 0.041 | 0.0179 | 0.0058 |
| ratio | 619 | 344 | 241 | 148 |

TABLE-continued

| | K, kg · mol kg$^{-1}$ bar$^{-1}$ at T° C. | | | |
|---|---|---|---|---|
| | T = 30° | T = 70 | T = 100 | T = 150 |
| Carbon $N_2$ | 41.5 × 10$^{-5}$ | 23.8 × 10$^{-5}$ | 16.9 × 10$^{-5}$ | 10.7 × 10$^{-5}$ |
| $CO_2$ | 4.46 × 10$^{-3}$ | 1.45 × 10$^{-3}$ | 0.73 × 10$^{-3}$ | 0.29 × 10$^{-3}$ |
| ratio | 10.7 | 6.1 | 4.33 | 2.71 |

Whereas, in the absence of a purge by second PSA system is preferably mainly carbon, when such a purge is used that adsorbent is preferably zeolite.

The present invention is of particular use in combinations wherein (a) the $CO_2$-containing gas released in the first PSA system is fed to a $CO_2$ purification system such as an adsorptive or liquid-absorption or distillation $CO_2$ recovery system; for this purpose the product $CO_2$-containing gas can, if desired, be compressed; and/or (b) with or without the above-mentioned $CO_2$ concentration, the $CO_2$-containing product gas is fed to urea synthesis; and/or (c) unadsorbed gas from the second PSA system is fed to ammonia synthesis, the latter advantageously being the source of ammonia for urea synthesis where, as mentioned above, the $CO_2$-containing product gas is used for urea synthesis.

Usually the product gases, ie $CO_2$-product gas released in the first PSA system, and the synthesis ready ammonia synthesis gas produced as the unadsorbed gas stream in the second PSA system have to be compressed before further use.

Since the efficiency of compressors tends to vary as the molecular weight of the gas being compressed varies it is advantageous, particularly in the case of the second PSA system to have sufficient beds that at least two beds on adsorption duty at any one time, but out of phase with one another, in order to minimise fluctuations in the composition of the gas fed to the compressor.

The chemical step preceding the first PSA system is preferably a catalytic shift step preferably decreasing the CO content to at most 1, preferably under 0.5, % $v/v$ on a dry basis. Cooling and liquid water separation are effected before the first PSA system, but the residual water vapour can be removed in the PSA system, without a separate drying operation.

Upstream of shift and water removal the preferred stage is hydrocarbon air-steam reforming in which catalytic primary steam reforming is effected in indirect heat exchange with catalytic air reforming and the product raw gas has an $(H_2+CO)/(MB-CO)$ molar ratio in the range 1.25 to 2.5, especially 1.5 to 2.1, a $CO_2$ content in the range 10 to 25% $v/v$, and at least 90% $v/v$ of the MB is $N_2$.

Preferred embodiments of the invention are shown in the accompanying drawings in which FIGS. 3-10 are flow sheets of the first PSA system showing various alternative embodiments making use of the waste gas from the second PSA unit as follows:

for final repressurisation (FIG. 3);

as a counter-current purge (FIG. 4);

as a co-current sweep then counter-current purge (FIG. 5);

as a co-current sweep then intermediate co-current repressurisation (FIG. 6);

as a co-current intermediate pressure sweep with recycle (FIG. 7);

as a co-current high pressure sweep with recycle (FIG. 8);

as a counter-current purge in a cycle using a sweep with $CO_2$-rich gas to recycle (FIG. 9); and as in FIG. 9 but for a 6 bed PSA unit (FIG. 10).

In the flow sheets the dotted horizontal lines represent divisions between successive time intervals of the PSA cycle. With the 4-bed units of FIGS. 2 to 9 there are four such intervals labelled T1 to T4 while in the 6-bed unit of FIG. 10 there are 6 time intervals T1 to T6.

The connections to the beds are positioned, in the flow sheets, so that gas entering the left hand side (LHS), and/or leaving the right hand side (RHS), of a bed is flowing co-currently. Conversely gas entering the RHS, and/or leaving the LHS, of a bed is flowing counter-currently.

In the flow sheets and ensuing description the following abbreviations are employed:

AD = adsorption duty (co-current)
E1 = intermediate equalisation (co-current—may be omitted).
E2 = final equalisation (co-current—may be the only equalisation as shown in FIGS. 2-8)
D1 = intermediate depressurisation (co-current—omitted in FIGS. 5, 9 and 10)
D2 = final depressurisation (counter-current)
PU = purge (counter-current)
SW = sweep (co-current)
R1 = initial repressurisation (counter-current)
R2 = intermediate repressurisation (counter-current—omitted in FIGS. 2-5, 7 and 8)
R3 = final repressurisation (co-current)
IG = inlet raw synthesis gas
W = waste gas from the second PSA system
SR = synthesis ready ammonia synthesis gas
U = unadsorbed gas from the first PSA system
M = unadsorbed gas from the first PSA system after methanation and water removal.
CR = $CO_2$-rich gas separated in first PSA system
MR = $CO_2$-lean/MB-rich gas separated in first PSA system
P = product gas (CR plus MR where these are not taken off separately).

Figure 1:
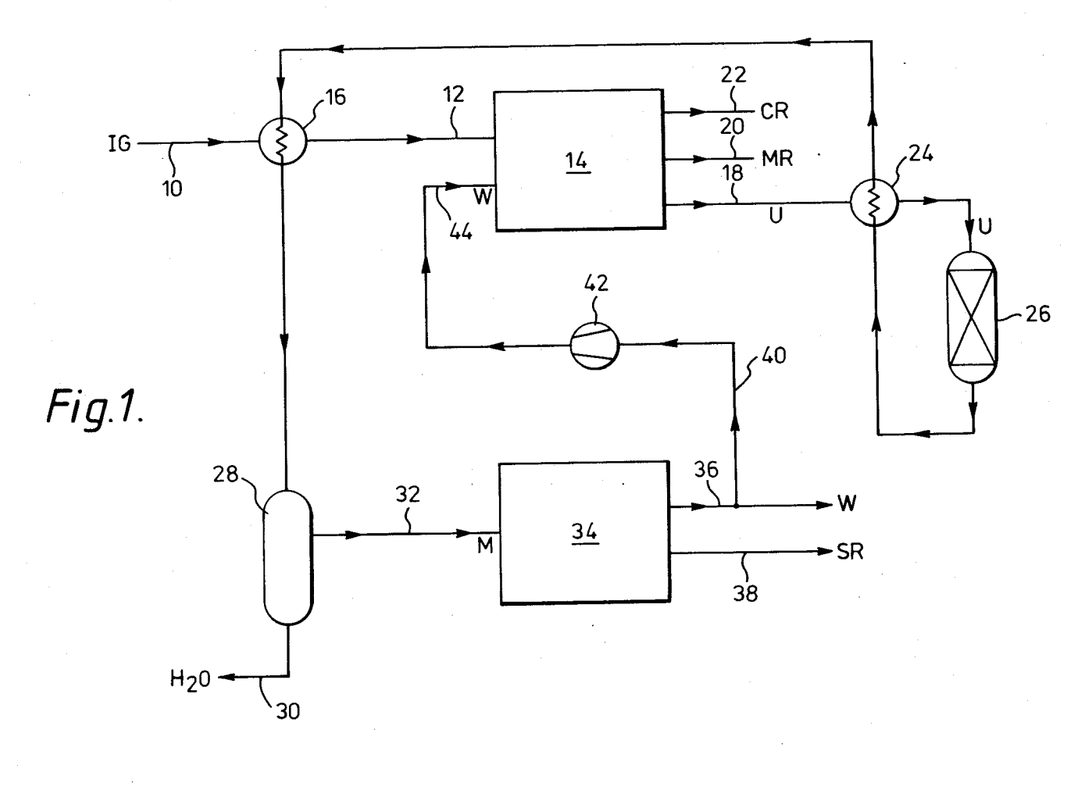
FIG. 1 is a block diagram of the overall flow sheet.

In the process of these embodiments a stream of raw ammonia synthesis gas, IG, from the process sequence of natural gas/steam primary reforming, air secondary reforming, heat exchange between the primary and secondary reforming, catalytic shift, cooling, and water separation, is fed, via line 10 to the inlet gas manifold 12 of a first PSA unit 14, optionally via a heat exchanger 16 where a hot inlet gas, IG, is required. PSA unit 14 has a plurality of beds, eg 4, 6, 8 or 10, of adsorbent and programmed valve actuators providing an uninterrupted succession of regenerated adsorbent beds and steps of pressure equalisation, depressurisation, purge, and repressurisation with an optional sweep step after adsorption but before depressurisation.

The raw synthesis gas, IG, contains $H_2$, $N_2$, CO, Ar, $CH_4$ and $CO_2$ and the PSA unit 14 is effective to give a stream, U, of unadsorbed gas, which is essentially free from $CO_2$, leaving PSA unit 14 via manifold 18. PSA unit 14 also gives one or two gas streams containing the $CO_2$ removed from the synthesis gas IG. As shown in FIG. 1, a $CO_2$-lean/MB-rich stream MR (which will contain a little $H_2$) and a $CO_2$-rich/MB-lean stream CR (which may contain a small amount of $H_2$), leave the PSA unit 14 via manifolds 20 and 22 respectively. Alternatively, as will be described there may be a single product gas stream P containing the $CO_2$ and some MB and a little $H_2$ leaving PSA unit 14: for convenience of description its manifold is also designated 22.

Where separate MR and CR streams are produced, the MR stream is taken from manifold 20 and may be used as a fuel for a gas turbine (not shown) driving, for example, one or more compressors. The CR stream or P stream, is taken from manifold 22 of PSA unit 14 to $CO_2$ recovery steps (not shown).

If the temperature at which PSA unit 14 is operated is above the critical temperature of $CO_2$ and high enough to limit adsorption of MB gases, the $CO_2$ content of the unadsorbed gas stream, ie stream U, is low, for example 0.5% $^v$/v or less, but not much of the MB and $H_2$ of the raw synthesis gas are separated in the PSA unit 14.

The unadsorbed gas stream, i.e. stream U, is fed from manifold 18 to a heat exchanger 24 wherein it is heated and passed to a methanator 26 in which it encounters a supported nickel catalyst. The temperature of the methanation inlet gas is controlled at such a level that both CO and $CO_2$ are methanated. The resulting methanated gas is cooled in heat exchanger 24 as the source of heat for heating the gas fed to methanator 26, cooled further in heat exchanger 16 as the source of heat for the raw gas, IG, entering PSA unit 14 where the latter is of the hot type, and finally cooled in cooler/separator 28 wherein liquid water is separated and removed via line 30. From cooler/saparator 28, the methanated gas from which water has been separated, i.e. gas stream M, is fed to the inlet manifold 32 of a second PSA unit 34. In PSA unit 34, which is operated at, for example, 30° C., the methanated gas M is separated to give a waste gas W containing $CH_4$, $N_2$, and Ar, as its main components, and the synthesis ready ammonia synthesis gas SR which has an $H_2:N_2$ ratio within the range 2.5 to 3.1. The waste gas W will contain a little $H_2$. The W and SR gases leave PSA unit 34 via manifolds 36 and 38 respectively.

Figure 2:
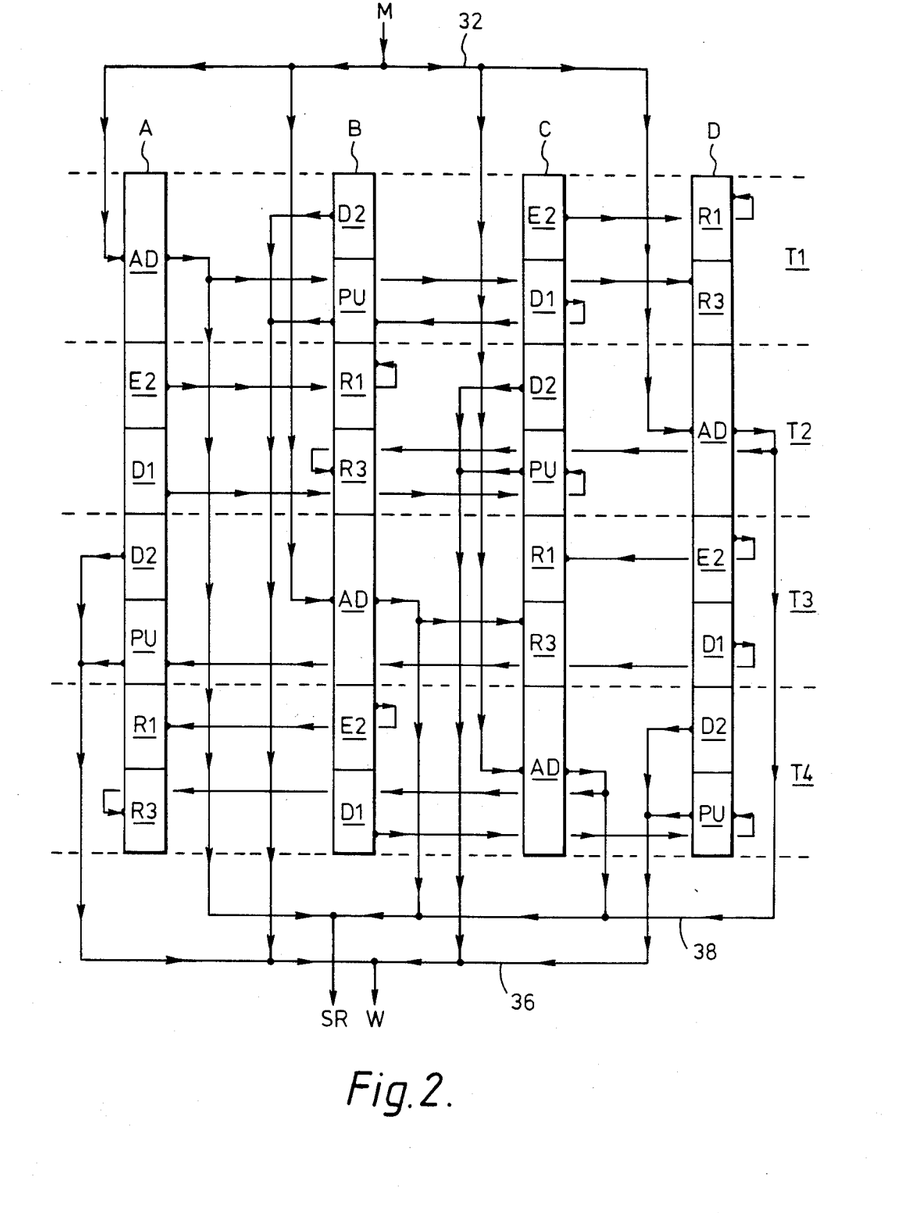
FIG. 2 is the flow sheet of the second PSA system.

PSA unit 34 is of the same general type as that of unit 14: a flow chart for a 4-bed PSA unit 34 is shown in FIG. 2.

During the first time interval T1, bed A is used for adsorption duty. In this duty the inlet of bed A is connected to the inlet manifold 32 for the methanated gas M and its outlet is connected to the outlet manifold 38 supplying the synthesis ready ammonia synthesis gas SR.

In the second time interval, wherein bed D is used for the adsorption duty, bed A is first subjected to a pressure equalisation step E2 wherein the inlet to bed A is closed and its outlet is connected to the outlet of bed B which has just been purged in step PU. When the pressures in beds A and B are equal, the outlet of bed A is disconnected from that of bed B and is connected to the outlet of bed C whose inlet is connected to the waste gas manifold 36. Bed A is thus subjected to a co-current depressurisation D1 wherein the gas in bed A passes co-currently out of bed A to bed C through which it passes, counter-currently, as a purge PU.

In the third time interval T3, wherein bed B is used for adsorption duty, the outlet of bed A is closed and its inlet is connected to the waste gas manifold 36: the bed is thus subjected to a counter-current depressurisation D2. The outlet of bed A is then connected to the outlet of bed D, which has just undergone the equalisation step E2, so that the gas released during the co-current depressurisation step D1 of bed D flows counter-currently through bed A as a purge, i.e. step PU.

In the fourth time interval T4, wherein bed C is used for adsorption duty, the inlet of bed A is closed and its outlet is connected to the outlet of bed B (which has just finished its adsorption duty AD) so that the gas released from bed B during its equalisation step E2 effects counter-current repressurisation R1 of bed A. Finally the outlet of bed A is closed and its inlet connected to the SR gas outlet manifold 38 (in FIG. 2, since this manifold 38 is being supplied, in this time interval, with gas from bed C, the connection to bed A is shown from the SR outlet time from bed C), to effect co-current repressurisation, step R3.

Bed A is thus ready to recommence adsorption duty. As shown in FIG. 2 the other beds go through the same cycle but out of phase with one another.

Some or all of the waste gas W from PSA unit 34 may be used as a fuel in a furnace or gas turbine, possibly in admixture with the MR (or P) gas stream from PSA unit 14. However, it is preferrred that at least part of the waste gas W from PSA unit 34 is fed back to PSA unit 14 via line 40 in FIG. 1. Unless PSA unit 34 is operated under conditions giving a waste gas W at a sufficiently high pressure for its intended use in PSA unit 14, it will generally be necessary to compress waste gas W in compressor 42 before it is supplied to the waste gas inlet manifold 44 of PSA unit 14.

Various uses of the waste gas W from PSA unit 34 in the PSA unit 14 are shown in the flow sheets of FIGS. 3 to 10.

Figure 6:
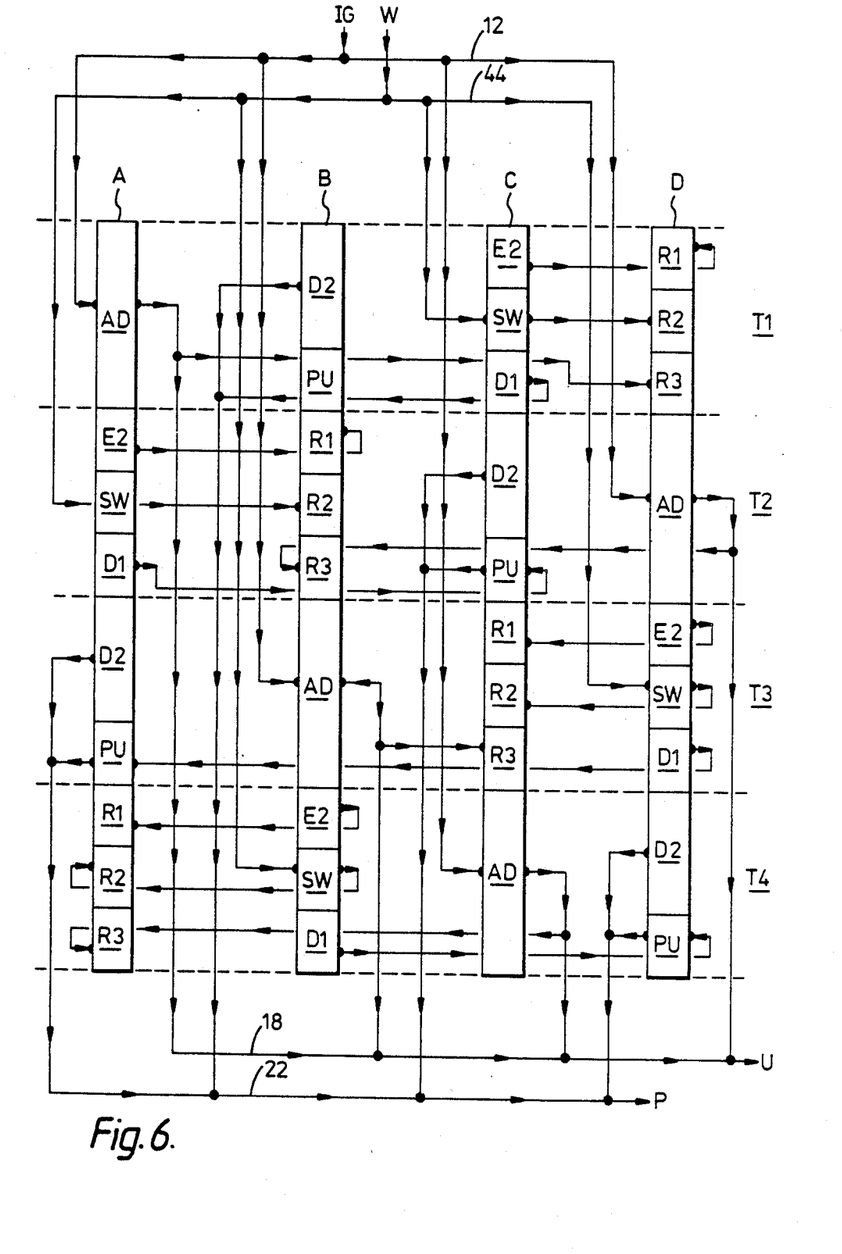
Figure 7:
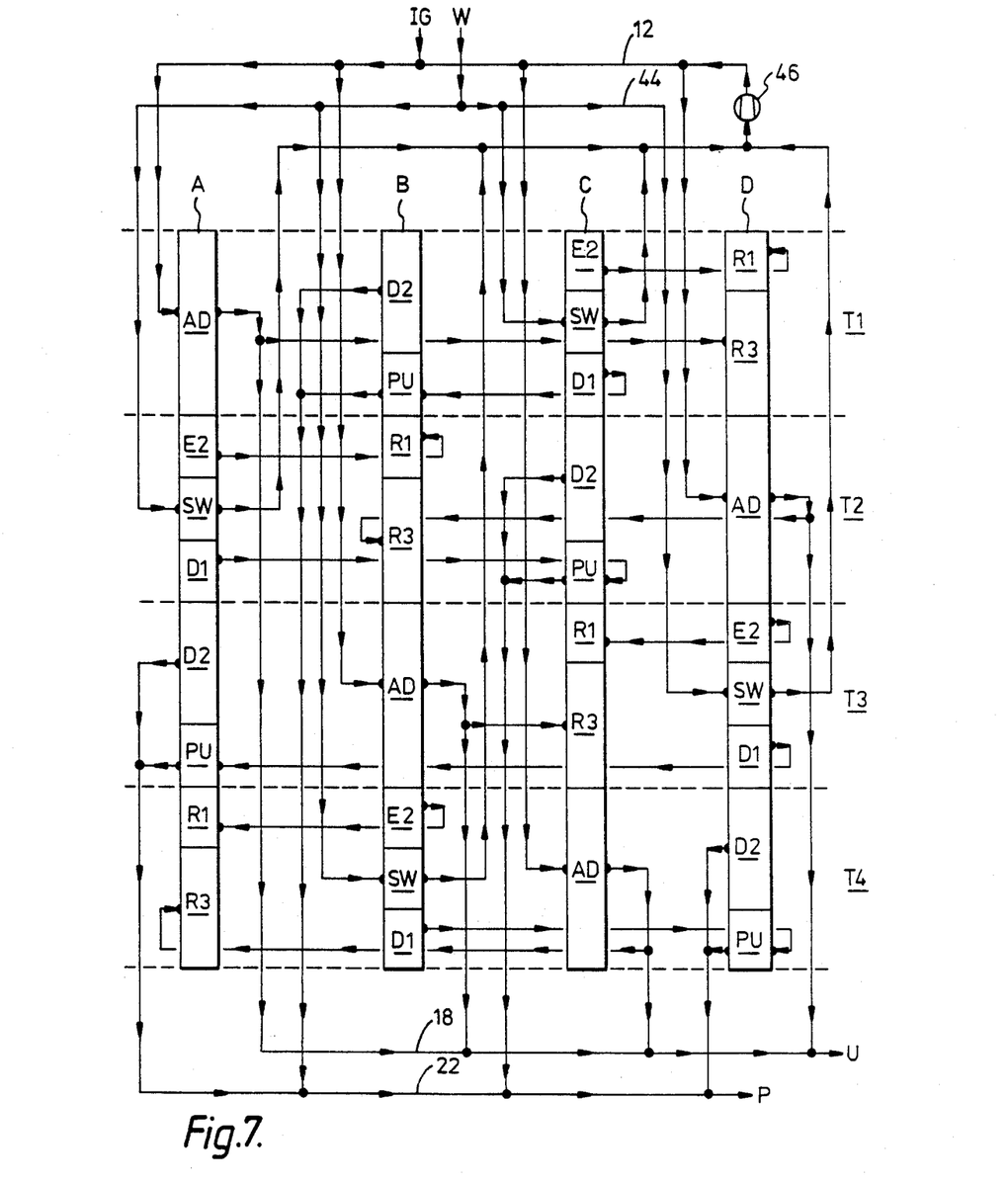
Figure 8:
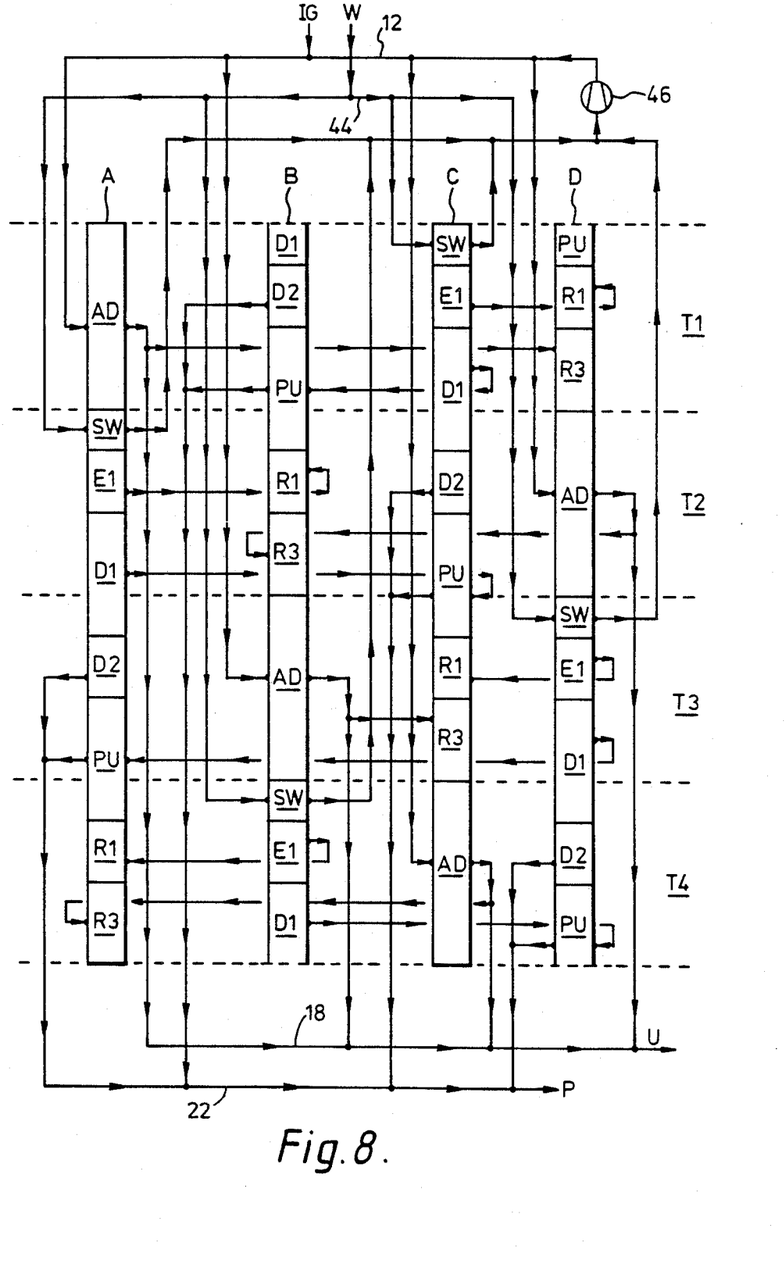

The cycle of the PSA unit 14 is similar to that described above for PSA unit 34. However, as shown in FIGS. 3–5, 9, and 10, the gas released from the bed in the final, counter-current, depressurisation step D2, and the purge step PU may be collected separately to give, respectively a $CO_2$-rich gas stream CR and a MB-rich gas stream MR. Such separate collection of CR and MR can also be adopted, if desired, in the embodiments of FIGS. 6–8. Alternatively, in the arrangements of FIGS. 3–5, the final depressurisation and purge gases can be collected as a single stream of product gas, P, as shown in the embodiments of FIGS. 6–8.

Figure 3:
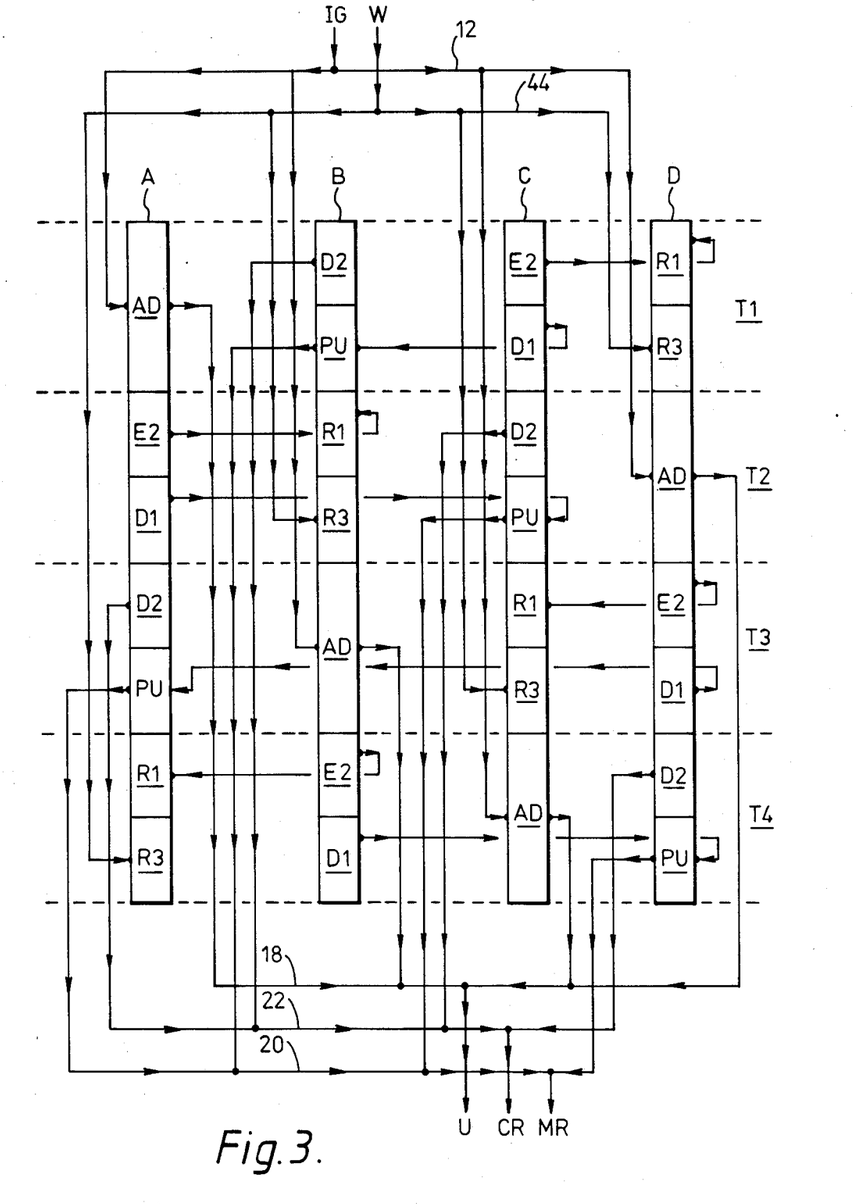

In the embodiment of FIG. 3, the waste gas W from PSA unit 34 is used for the co-current rapressurisation step R3 instead of using gas from the manifold 18 supplied with gas from a bed undergoing adsorption duty AD. This has the advantage that $H_2$ otherwise lost in the waste gas W from PSA unit 34 is returned to the system.

Alternatively, in an embodiment not illustrated, this final repressurisation, or at least the initial part thereof, may be effected with part of the SR gas leaving PSA unit 34 instead of with the waste gas: this has the advantages that the amount of MB returned to PSA unit 14 in this repressurisation step R3 is minimised and also that less, if any, compression of this returned gas is required.

Figure 4:
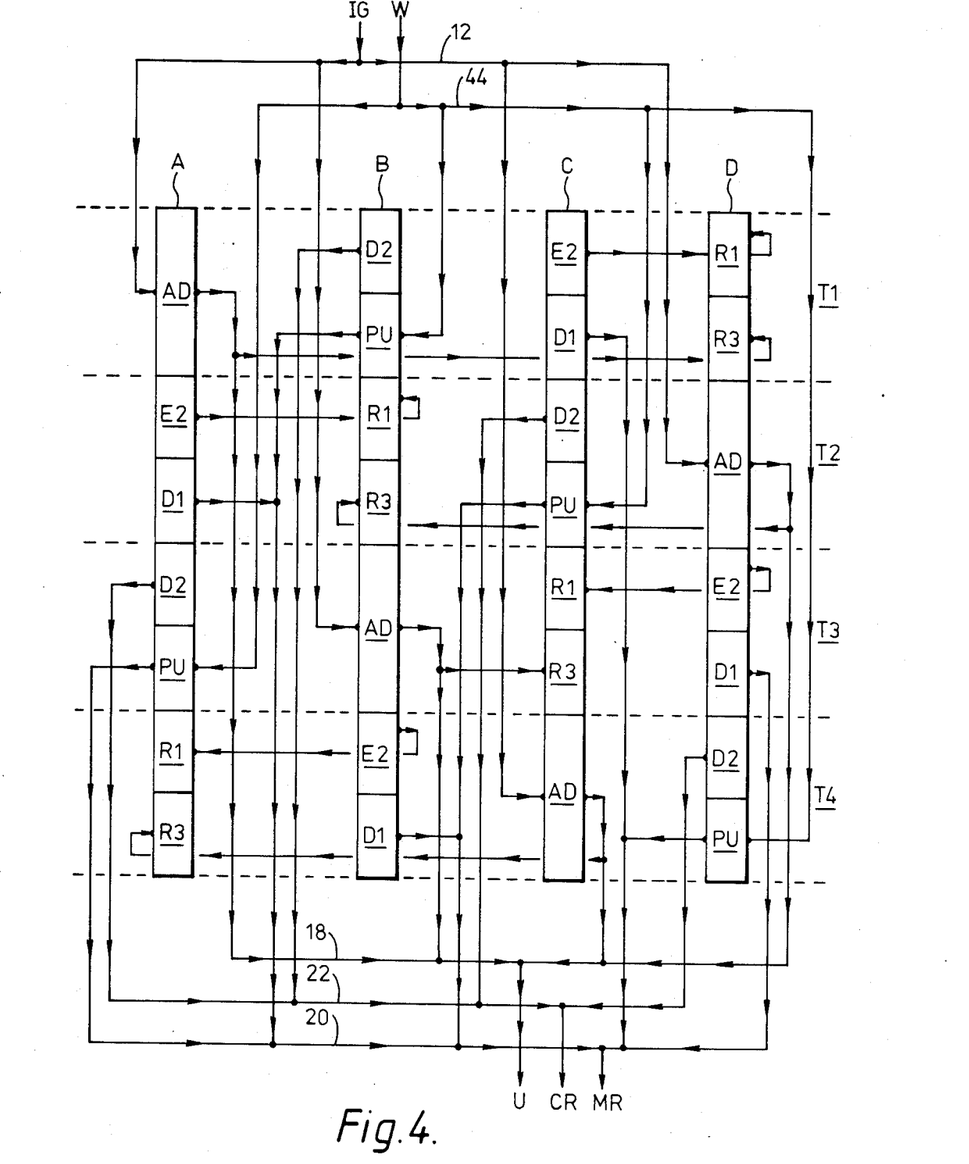

In the embodiment of FIG. 4 the waste gas W from PSA unit 34 is used as the purge gas: thus the gas leaving the bed undergoing the co-current depressurisation step D1 in PSA unit 14 is taken directly to the MR gas outlet manifold 20 while the waste gas W from PSA unit 34 is fed to the outlet of the bed of PSA unit 14 undergoing the purge step PU. This has the advantage that the MR gas has a lower $CO_2$ content than in the embodiment of FIG. 3. Consequently in this embodiment generally the CR and MR gases will be collected separately, as shown, rather than combined to give a single product gas P.

Figure 5:
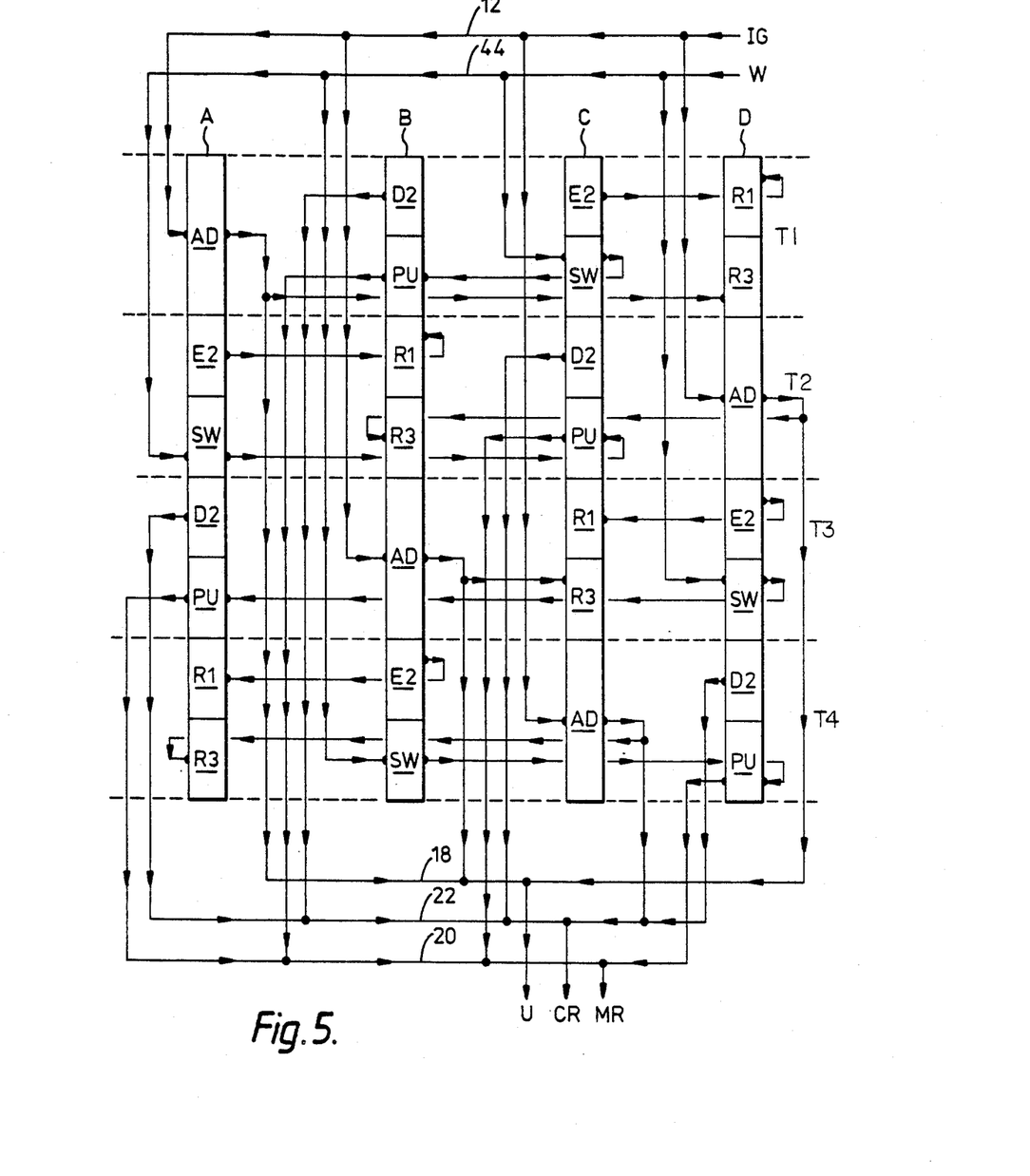

In the embodiment of FIG. 5, the co-current depressurisation step D1 is replaced by a sweep step SW wherein the waste gas W from PSA unit 34 is fed to the inlet of a bed that has undergone the equalisation step E2. The outlet of the bed undergoing the sweep step SW is connected, as in the embodiment of FIG. 3, to the outlet of a bed undergoing the counter-current purge PU. This has the advantage that the CR gas produced in the counter-current depressurisation step D2 following the sweep step SW will contain virtually no hydrogen.

In the embodiments of FIGS. 6 and 7 a co-current sweep step SW using the waste gas W from PSA unit 34 is interposed between the equalisation step E2 and the co-current depressurisation step D1. In the FIG. 6 embodiment the gas swept from the bed is used for an intermediate, co-current, repressurisation step R2. This has the advantage that $H_2$ in the waste gas W is returned to the system. However it will be seen that the pressure at which the waste gas has to be supplied increases, as in the embodiment of FIG. 3 as repressurisation proceeds. Thus during the course of the sweep the pressure has to increase from that remaining after equalisation towards the adsorption pressure. In the embodiment of FIG. 7 the gas swept from the bed is returned, via a compressor 46, to the inlet gas manifold 12. This has the advantage of returning the $H_2$ as in the FIG. 6 embodiment with the further advantage that, unlike the FIG. 3 and FIG. 6 embodiments, the compressor 42 in the waste gas W inlet line 40 is not subject to a fluctuating load.

In the embodiment of FIG. 8 the cycle is similar to that of FIG. 7 except that the sweep step SW is before, instead of after, the equalisation step E2. This is more advantageous than the system of FIG. 7 where the waste gas W from PSA unit 34 is at a higher pressure.

Figure 9:
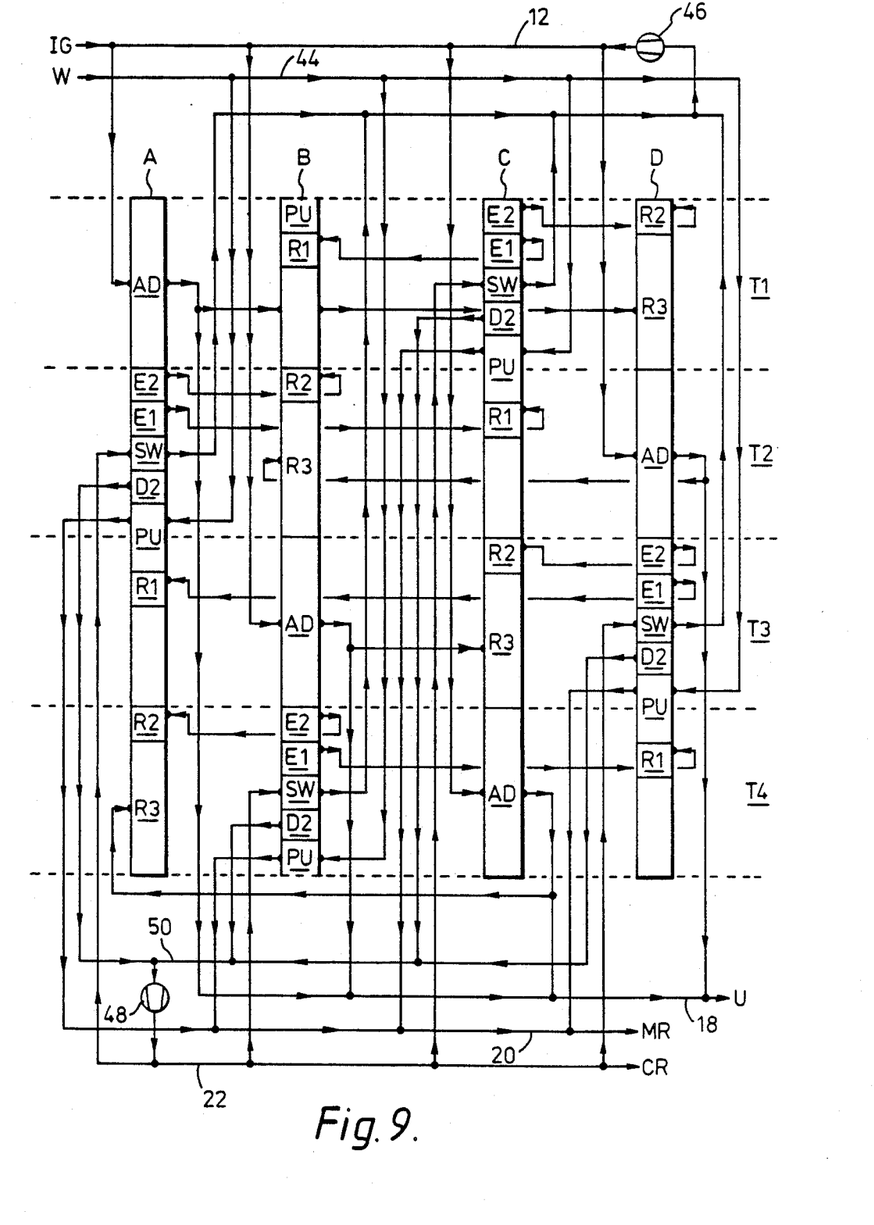

In the embodiment of FIG. 9 the waste gas W from PSA unit 34 is used as purge gas, as in the FIG. 4 embodiment, but also a co-current sweep step SW is employed in place of the co-current depressurisation with the swept gas being returned to the inlet gas manifold 12 via compressor 46 as in the FIG. 7 embodiment. In this case the gas used for the sweep step SW is $CO_2$-rich gas CR taken, via compressor 48, from the manifold 50 supplied with gas from the counter-current depressurisation step D2. Although in this embodiment there is no bed undergoing step D2 at the time of the sweep step SW, a sufficient reservoir of CR gas with probably be available in the pipework and/or a small reservoir vessel can be provided. Alternatively the CR gas used for the sweep can be gas from external processing of the CR gas exported from PSA unit 14. By means of this $CO_2$-rich gas sweep, the CR gas produced in the subsequent counter-current depressurisation will be particularly pure.

In this embodiment two equalisation steps E2 and E1 are shown: before the final equalisation E2 in which the released gas effects initial counter-current repressurisation R1 of a bed that has been purged, an intermediate equalisation step E1 is employed for intermediate counter-current repressurisation R2 of another bed that has already been subjected to the initial repressurisation R1 by gas released from a final equalisation step E2. Such multiple equalisations may also be adopted where appropriate in the embodiments of FIGS. 3 to 8.

In the embodiment of FIG. 9 each time interval is typically about 6 minutes. Referring to bed A, at the end of interval T1, the CO₂ adsorption front is well short of the bed outlet. In intervcal T2 the two equalisation steps are first effected with the result that bed B has been repressurised to over half the adsorption pressure and bed C to over one quarter of the adsorption pressure. Beds B and C have had such $CO_2$ adsorption fronts as remained moved back towards the bed inlets. Up to three quarters of the $H_2$ left in bed A at the end of the adsorption step, i.e. in the void space and as adsorbed gas, has been returned to the process.

In the sweep step SW in interval T2 the gas is allowed to flow until most of the $H_2$ and MB gas has been swept out of the bed, but is stopped before significant $CO_2$ breaks through. The gas in bed A is now almost exclusively $CO_2$. In the counter-current depressurisation step D2 also in interval T2, the major proportion of the gas is exported as CR gas and only a minor proportion is used for the sweep. It will be appreciated that the CR export can be taken from the manifold 50 before compressor 48 if desired: however since the exported CR gas will normally have to be compressed in its subsequent processing, it is often more convenient to effect the compression of all the gas released in the counter-current depressurisation step D2 and to export the CR gas, as shown, from manifold 22 after compressor 48. After the counter-current depressurisation step D2, the purge step is effected to purge the remaining $CO_2$ from the bed: since the time remaining in interval T2 is unlikely to be sufficient to effect completion of the purge, the purge can continue, as shown, into interval T3.

Figure 10:
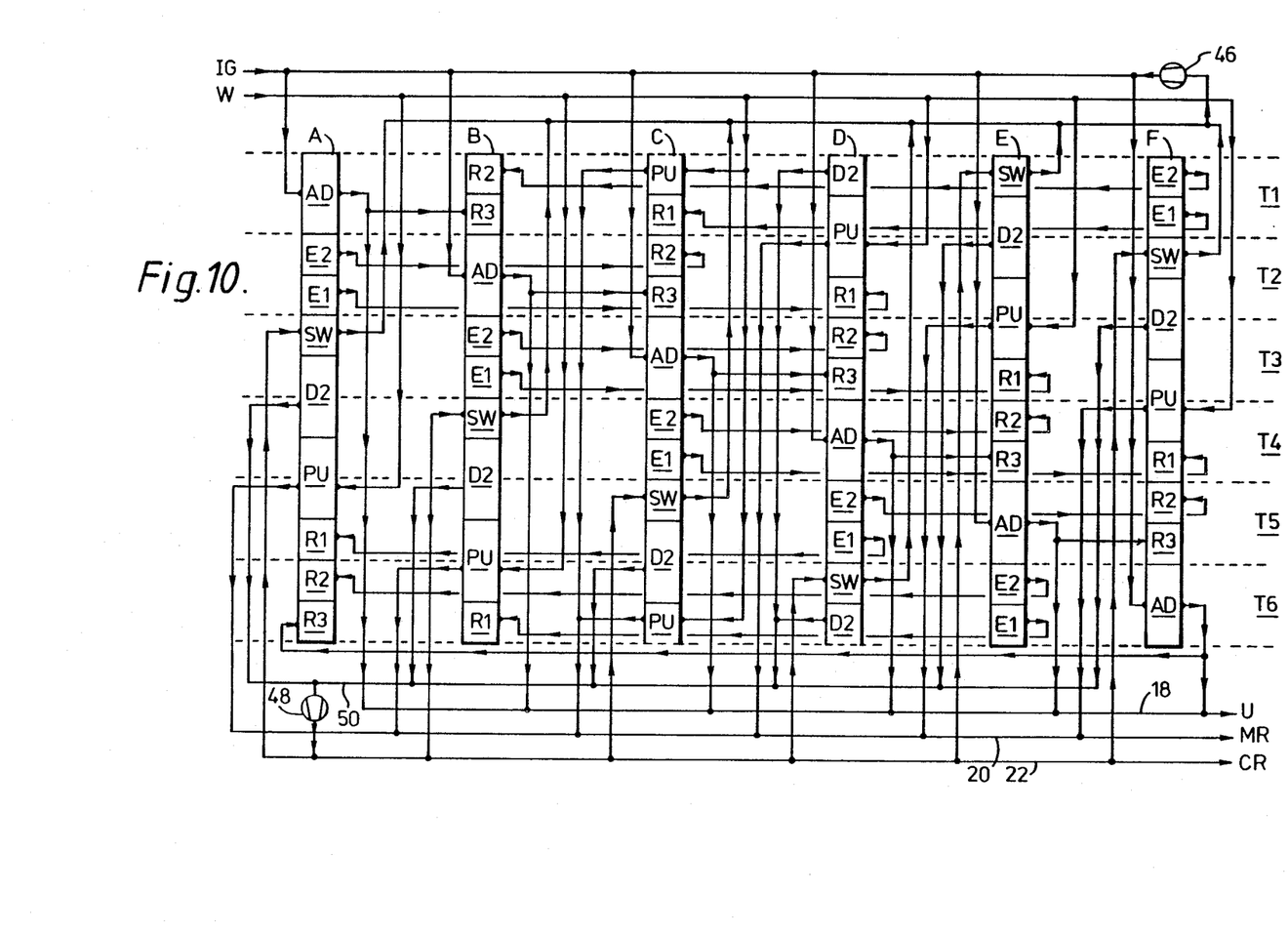

In the embodiment of FIG. 10, a 6 bed arrangement for effecting the cycle of FIG. 9 is shown. There it is seen that a bed is undergoing counter-current depressurisation D2 while the sweep SW is taking place and so no reservoir for CR gas is required. Since in the FIG. 10 embodiment each time interval only includes 1 or 2 steps, whereas in the FIG. 9 embodiment up to 5 steps were required in each time interval, the time intervals in the FIG. 10 embodiment can, if desired, be shorter than those of the FIG. 9 embodiment.

In a further embodiment, not shown in the Figures, the arrangement of FIG. 9 is modified by the omission of the equalisation steps E1 and E2 and the corresponding initial and intermediate repressurisation steps R1 and R2. In this embodiment the final repressurisation R3 is preferably using some of the synthesis ready ammonia synthesis gas from the second PSA unit. This embodiment has the advantage of reducing the number of beds required in the first PSA system, in some cases to as few as two, at the expense of increased power requirement e.g. in compressors 46 and 48.

We claim:

1. A process for the production of a stream of synthesis-ready ammonia synthesis gas from a raw synthesis gas stream produced by the shift reaction and subsequent water separation and containing:
   hydrogen;
   carbon dioxide;
   nitrogen in an excess of that required for ammonia synthesis;
   methane;
   argon; and
   carbon monoxide in an amount of at most 1% v/v; said process comprising:
   (A) subjecting the raw synthesis gas stream to a first pressure swing absorption (PSA) system effective to remove carbon dioxide, but leaving the hydrogen, nitrogen, argon, methane, and carbon monoxide largely unadsorbed, said first PSA system having a plurality of adsorbent beds each of which undergoes a pressure swing adsorption cycle including the steps of
   adsorption, wherein a feed gas comprising the shifted gas is fed to the bed;
   depressurization; and
   repressurization; thereby producing a first unadsorbed gas stream;
   (B) subjecting the first unadsorbed product gas stream to catalytic methanation to convert the carbon monoxide, and any residual carbon dioxide, in the first unadsorbed product gas stream to methane, thereby producing a methanated gas stream;
   (C) removing nitrogen from the methanated gas stream so as to adjust the hydrogen:nitrogen ratio to that of the desired synthesis-ready ammonia synthesis gas stream by subjecting the methanated gas stream to a second PSA system effective to separate the requisite amount of nitrogen from the methanated gas stream as a waste gas stream, said second PSA system having a plurality of adsorbent beds each of which undergoes a pressure swing adsorption cycle including steps of
   adsorption;
   depressurization; and
   repressurization; thereby leaving as the unadsorbed gas stream the desired synthesis ready ammonia synthesis gas; and
   (D) feeding at least part of said waste gas stream from the second PSA system back to the first PSA system.

2. A process according to claim 1 wherein the raw synthesis gas has
   (a) a molar ratio of the sum of the molar proportions of hydrogen and carbon monoxide to the sum of the total molar proportions of nitrogen, methane and argon in the range 1.25 to 2.5;
   (b) a carbon dioxide content in the range of 10 to 25% v/v; and
   (c) a nitrogen content such that at least 90% v/v of the total of nitrogen, methane, argon, and carbon monoxide is nitrogen;
   the amount of nitrogen removed in the second PSA system is such as to give a synthesis-ready ammonia synthesis gas having a hydrogen to nitrogen molar ratio in the range 2.5 to 3.1.

3. A process according to claim 1 wherein the pressure swing adsorption cycle of the first PSA system also includes at least one of the following steps:
   pressure equalization between the adsorption and depressurization steps;
   sweeping after the adsorption step but before depressurization, wherein a sweep gas is fed to the bed to sweep residual gas from that bed; and
   purging between the depressurization and repressurization steps, wherein a purge gas is fed to the bed to purge residual gas from that bed; and
   wherein said at least part of said waste gas from the second PSA system which is fed back to the first PSA system is used therein as the gas employed for at least one of said sweeping, purging, and repressurization steps.

4. A process according to claim 1 wherein the pressure swing adsorption cycle of the second PSA system also includes one or more of:

pressure equalization between the absorption step and the depressurization step; and a purging step between the depressurization step and the repressurization step wherein a purge gas is fed to the bed to purge residual gas from said bed.

5. A process according to claim 3 wherein the first PSA system cycle includes a co-current sweep step and waste gas from the second PSA system is used in the first PSA system as sweep gas to sweep residual gas from a bed that has finished its adsorption step, but has not been depressurized, into another bed.

6. A process according to claim 5 wherein the first PSA system cycle includes a step of pressure equalization between the adsorption and depressurization steps and the sweeping of the first PSA system bed is effected co-currently after said pressure equalization step and the residual gas is swept into a bed undergoing repressurization.

7. A process according to claim 3 wherein the first PSA system cycle includes a purge step and the residual gas swept from the bed by the sweep step is used as the purge gas in the purge step operated on another bed of the first PSA system.

8. A process according to claim 3 wherein the first PSA system cycle includes a sweep step and waste gas from the second PSA system is used in the first PSA system as sweep gas to sweep residual gas from a bed that has finished its adsorption step, but has not been depressurized, and said residual gas is compressed and recycled as part of the feed gas.

9. A process according to claim 8 wherein the first PSA system cycle includes a pressure equalization step and the sweep step is effected after said pressure equalization step.

10. A process according to claim 3 wherein the first PSA system cycle includes a sweep step, a pressure equalization step, and a purge step, and wherein carbon dioxide-rich gas released in a counter-current depressurization step of the first PSA system cycle is compressed;

said compressed carbon dioxide-rich gas is used as the sweep gas to sweep residual gas from a bed after said pressure equalization step;

said residual gas swept from the bed is compressed and recycled as part of the feed gas; and waste gas from the second PSA system is used as the purge gas in the purge step of the first PSA system cycle.

11. A process according to claim 1 wherein the shifted gas has a $(H_2+CO)/(MB-CO)$ molar ratio in the range 1.25 to 2.5 where $H_2$, CO, and MB represent the molar proportions of hydrogen, carbon monoxide, and total medium boiling gas (including carbon monoxide) respectively, and a carbon dioxide content in the range 10 to 25% v/v, and at least 90% v/v of the medium boiling gas is nitrogen, and in the second PSA system, the amount of nitrogen removed is such as to give a synthesis-ready ammonia synthesis gas having a hydrogen:nitrogen molar ratio in the range 2.5 to 3.1.

* * * * *